US007762383B2

(12) United States Patent
Damen

(10) Patent No.: US 7,762,383 B2
(45) Date of Patent: Jul. 27, 2010

(54) FREEZE DRYER

(75) Inventor: Franciscus Damen, Langeweg (NL)

(73) Assignee: IMA Life S.r.l., Ozzano Dell'Emilia (IT)

( * ) Notice: Subject to any disclaimer, the term of this patent is extended or adjusted under 35 U.S.C. 154(b) by 355 days.

(21) Appl. No.: 11/628,693

(22) PCT Filed: Jun. 6, 2005

(86) PCT No.: PCT/GB2005/002191

§ 371 (c)(1),
(2), (4) Date: Oct. 5, 2007

(87) PCT Pub. No.: WO2005/121671

PCT Pub. Date: Dec. 22, 2005

(65) Prior Publication Data

US 2008/0131240 A1 Jun. 5, 2008

(30) Foreign Application Priority Data

Jun. 11, 2004 (GB) ................................ 0413117.3

(51) Int. Cl.
*B65G 25/00* (2006.01)

(52) U.S. Cl. .................. 198/429; 198/432; 198/457.07; 198/598; 242/397; 242/397.5; 242/566; 414/214; 414/287; 414/791.7; 414/226.01; 414/18; 34/92

(58) Field of Classification Search ................. 414/287, 414/791.7, 226.01, 18; 34/573, 92, 217, 34/236; 198/346.2
See application file for complete search history.

(56) References Cited

U.S. PATENT DOCUMENTS 3,469,327 A * 9/1969 Catelli et al. ................... 34/92
4,815,921 A 3/1989 Yamamoto et al.
5,129,162 A * 7/1992 Hemmersbach et al. ....... 34/284
5,477,663 A * 12/1995 Smith et al. ................... 53/475
5,551,821 A 9/1996 Hall et al.
6,692,214 B1 * 2/2004 Shida et al. ............ 414/416.03

(Continued)

FOREIGN PATENT DOCUMENTS

DE 29 42 583 4/1981

(Continued)

OTHER PUBLICATIONS

EPO International Search Report; Completed Oct. 17, 2005; Authorized Officer: H. Silvis.

(Continued)

*Primary Examiner*—Saúl J Rodríguez
*Assistant Examiner*—Glenn Myers
(74) *Attorney, Agent, or Firm*—Knobbe Martens Olson & Bear LLP

(57) ABSTRACT

A freeze dryer comprises a chamber having a rectangular slot through which vials are inserted into the chamber. An assembly for loading and/or unloading the chamber comprises a transfer bar extending across the slot. The bar is pivotally attached at each end to first and second flat springs, each spring being wound on a respective rotatably mounted spool located proximate the slot. Drive means are provided for synchronously rotating the spools to effect movement of the bar into or out from the chamber and for selectively rotating the spools to raise or lower the bar.

18 Claims, 18 Drawing Sheets

U.S. PATENT DOCUMENTS

| | | | | |
|---|---|---|---|---|
| 6,869,262 | B2 * | 3/2005 | Yamashita et al. | 414/217 |
| 6,997,666 | B1 * | 2/2006 | Rodgers et al. | 414/331.06 |
| 2006/0263179 | A1 * | 11/2006 | Selch | 414/222.01 |

FOREIGN PATENT DOCUMENTS

| | | |
|---|---|---|
| DE | 44 24 287 A1 | 1/1996 |
| DE | 201 02 879 | 10/2001 |
| EP | 0618417 | 5/1994 |
| FR | 2643346 | 8/1990 |
| GB | 697 925 | 9/1953 |
| JP | 63235214 | 9/1988 |
| WO | WO 96/35090 | 11/1996 |
| WO | WO 2004/074143 | 9/2004 |

OTHER PUBLICATIONS

Great Britain Search Report Under Section 17; Completed Oct. 21, 2004; Authorized Officer: Mr. Rupert Knights.

* cited by examiner

FREEZE DRYER

FIELD OF THE INVENTION

The present invention relates to an assembly for loading and/or unloading a freeze dryer or the like.

BACKGROUND OF THE INVENTION

Freeze dryers typically incorporate a pressure vessel having a freeze drying chamber for receiving a plurality of containers or vials typically containing sterile material to be freeze dried. Access to the chamber for automated loading and removal of vials is through a rectangular opening, or slot, formed in a wall or in the main door of the chamber. The slot is closed by a slot door which, with the chamber, forms a vacuum seal around the slot.

To enable vials to be inserted into the chamber, the slot door is vertically raised relative to the slot by moving the slot door along guide tracks. A loading mechanism provided opposite the slot door pushes vials from a conveyor on to a shelf of the chamber. The vials may be loaded row by row on to a shelf, a number of rows at a time, or a complete shelf full at a time. The loading mechanism is subsequently withdrawn and the slot door closed to enable the contents of the vials to be freeze dried. The vials can be subsequently removed from the chamber, typically in the same manner (row by row or shelf by shelf) as they were loaded into the chamber, using an unloading mechanism.

Pharmaceutical freeze dryers are usually at least partially housed in a clean room, with the loading and unloading mechanism being located in a sterile environment, for example an isolator, adjacent the clean room environment. The size of these loading and unloading mechanisms can contribute greatly to the overall size of the foot-print of the freeze dryer. As the cost of maintaining the sterile environment generally increases with size, conventional loading and unloading mechanisms, typically requiring around 2 $m^2$ and 1 $m^2$ of floor space respectively, can significantly increase running costs. Whilst locating part of these mechanisms outside of the isolator can assist in reducing the size of the foot-print within the isolator, parts moving into the sterile environment from outside would require sealing, using a bellows or the like, to maintain sterile conditions within the isolator. Furthermore, those parts of an unloading mechanism which are permanently housed within the chamber, such as a push bar for pushing the vials back on to the conveyor, must be able to withstand conditions prevailing within the chamber during use of the freeze dryer.

SUMMARY OF THE INVENTION

An embodiment of the present invention is to provide a mechanism for loading and/or unloading a freeze dryer which can significantly reduce the size of the overall foot-print of the freeze dryer and which can be readily incorporated within a sterile environment.

In a first aspect, the present invention provides an assembly for loading vials into and/or unloading vials from a chamber of a freeze dryer or the like, the assembly comprising a transfer bar for engaging vials to effect movement thereof, and means for moving the bar, characterised in that the moving means comprises first and second pairs of coils of elongate resilient members, means for connecting the coils to the transfer bar such that the transfer bar is pivotally attached at each end thereof to a respective pair of coils, and drive means for synchronously unwinding the coils to effect lateral movement of the bar and for selectively winding or unwinding one of the coils of each pair relative to the other to raise the bar.

The invention can thus provide a compact assembly for unloading vials from, or both loading vials into and subsequently unloading the vials from the same side of, a chamber of a freeze dryer. As the assembly can be readily incorporated within a sterile environment of, for example, an isolator, the use of bellows or other such mechanisms can be eliminated. Furthermore, enabling the freeze dryer to be both loaded and unloaded using apparatus provided on one side only of the dryer can significantly reduce the overall size of the foot-print of the freeze dryer.

The drive means preferably comprises means for rotating synchronously each pair of coils to effect lateral movement of the bar, and means for selectively effecting relative rotational movement between the coils of each pair to raise the bar. For example, each coil may be wound on a respective spool, with the drive means being arranged to rotate the spools to move the bar. The coils are preferably retained on the spools by a plurality of rollers extending about the spools, which rollers can further serve to guide the spools as they are unwound to effect movement of the bar. Further guide means may be provided in the form of slots located on either side of the transfer bar, the free end of each coil being located within a respective slot. These slots may be fixed, or may be at least partially selectively moveable between deployed and stowed positions. For example, parts of the slots within the chamber may be retracted when the transfer bar has been withdrawn from the chamber to enable a shelf of the dryer to be raised or lowered, for example, to enable another shelf to be loaded or unloaded as required.

The connecting means preferably comprises first and second connecting members each attached to a respective end of the transfer bar and extending substantially orthogonal to the transfer bar, with a first coil of each pair being attached to a connecting member via a first linking member, and a second coil of each pair being attached to a connecting member via a second linking member. Each first coil is preferably rigidly attached to a respective first linking member, with each first linking member being pivotally attached to a respective connecting member. Each second coil is preferably rigidly attached to a respective second linking member, each second linking member being pivotally attached to a respective connecting member via a respective arm pivotally attached to both the second linking member and the connecting member. This can enable the second coils to be wound or unwound relative to the first coils to effect raising of the bar.

A surface of the transfer bar preferably has a first shoulder for stabilising vials engaged thereby during loading of the chamber, and a second shoulder for stabilising vials engaged thereby during unloading of the chamber.

Each elongate member preferably comprises a resilient band, for example a flat spring.

In a second aspect, the present invention provides a freeze dryer comprising a chamber and an assembly as aforementioned for loading vials into and/or removing vials from the chamber, preferably through a slot provided in a wall of the chamber.

BRIEF DESCRIPTION OF THE DRAWINGS

Preferred features of the present invention will now be described with reference to the accompanying drawings, in which.

DETAILED DESCRIPTION OF THE INVENTION

Figure 1:
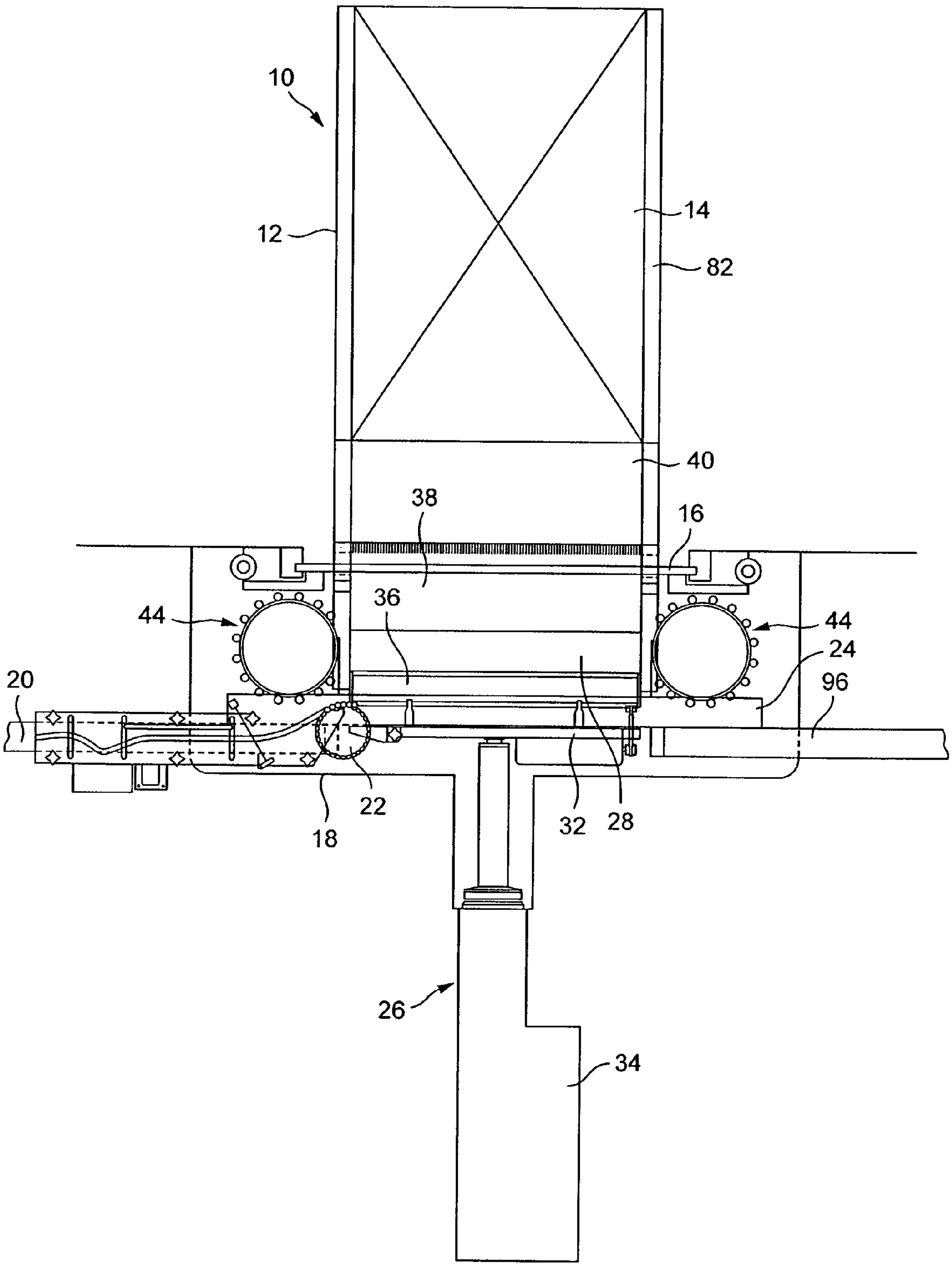
FIG. 1 is a plan view of a first embodiment of a freeze dryer.

With reference to FIG. 1, a freeze dryer 10 comprises a chamber 12 (extending orthogonally relative to the plane of FIG. 1) having a slot (not shown) formed in the front wall of the chamber 12 to enable vials to be loaded on to and unloaded from a shelf 14 in the chamber 12. The slot can be closed by a slot door 16 moveable relative to the chamber 12. The chamber 12 includes a number of shelves 14, each of which can be raised and lowered within the chamber 12 using a shelf location mechanism (not shown). To load the shelves, the shelves are initially collapsed in the lower portion of the chamber, and the uppermost shelf is first moved into a loading position. After that shelf has been loaded, the mechanism automatically raises the loaded shelf to enable the next shelf to be moved to the loading position. This moving sequence continues until the chamber loading has been completed. To unload the chamber, the loading sequence is reversed, with the lowermost shelf being unloaded first.

An assembly for loading and unloading the chamber 12 is formed from several modules supported by a supporting frame located in an isolator cabinet 18. The assembly enables automated loading of the freeze dryer 10 with vials received from a filling machine, and automated unloading of those vials from the freeze dryer for subsequent conveyance to a capping machine.

The supporting frame is bolted to the frame of the freeze dryer 10, and to the floor of the isolator. The supporting frame is formed from strong stainless steel plates. Within the isolator 18, the external surfaces of the supporting frame and the modules of the assembly for loading and unloading the chamber are designed so as to be readily accessible for cleaning and sterilising in situ using, for example, vaporised hydrogen peroxide.

The modules of the assembly for loading and unloading the chamber 12 will now be described.

An in-feed conveyor 20 collects the vials coming from a filling machine (not shown) located outside the isolator and conveys the vials to an in-feed star wheel 22 mounted on the supporting frame. Appropriate guiding ensures a smooth transition between the in-feed conveyor 20 and the in-feed star wheel 22 with correct feeding of the in-feed star wheel 22. For small vials subject to tipping, a mechanical reject system may be provided upstream from the in-feed star wheel 22 to reject fallen vials. The in-feed conveyor 20 is driven by a motor located beneath the supporting frame.

The in-feed star wheel 22 serves to position the vials received from the in-feed conveyor on to a pusher conveyor 24. The in-feed star wheel 22 and the pusher conveyor 24 are driven by respective servomotors located beneath the supporting frame. The rotational speed of the in-feed star wheel 22 can be synchronised with the speed of the pusher conveyor 24. Control of the starting, acceleration, deceleration and stopping of the in-feed star wheel 22 relative to the pusher conveyor 24 can be used to convey the required number of vials on to the pusher conveyor 24 and to control the pitch of those vials.

Figure 2A:
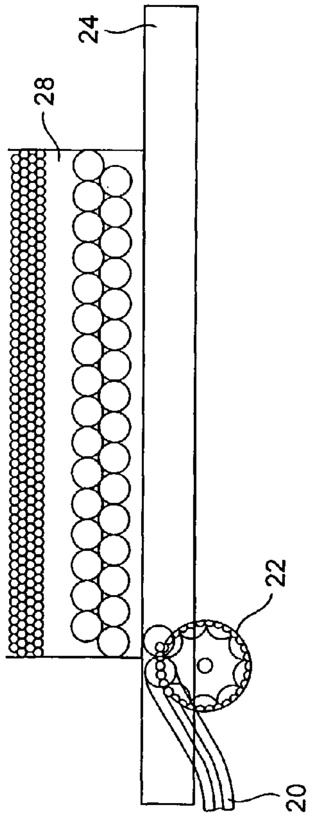
FIGS. 2(*a*) and (*b*) illustrate respective arrangements of vials prepared for loading into the freeze dryer of FIG. 1.
Figure 2B:
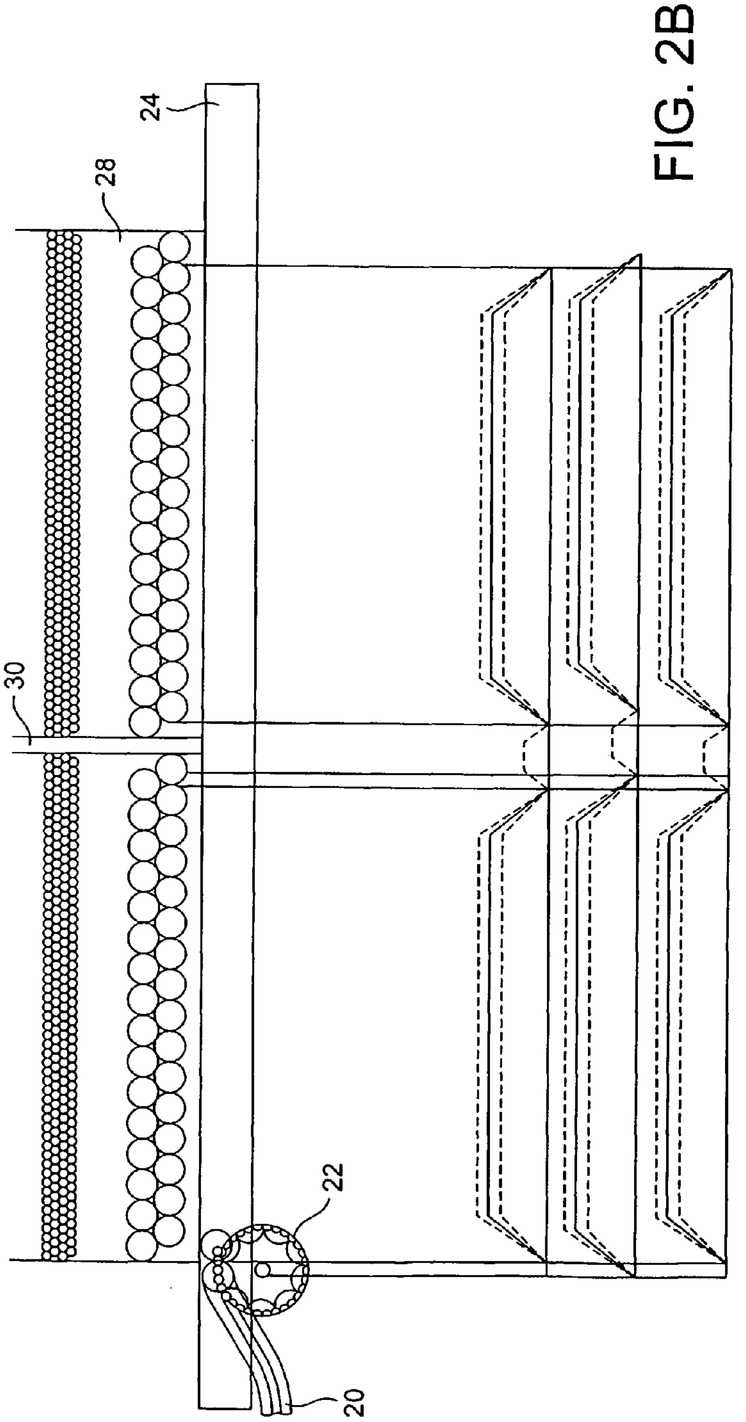

A loading pusher 26 pushes vials from the pusher conveyor 24 on to an accumulation table 28. As shown in FIG. 2(*a*), the movement of the in-feed star wheel 22 and pusher conveyor 24 can be controlled so that each row of vials accumulated on the pusher conveyor is laterally displaced from the previous row by an amount equal to one half of the vial width. This can enable close packing of the rows of vials on the accumulation table 28. As shown in FIG. 2(*b*), when loading two separate vial packs on a wide shelf 14 the in-feed star wheel 22 can form in the rows of vials a gap in the middle of the row of width equivalent to the width of a shelf guide 30. With reference to FIG. 1, the loading pusher 26 comprises a pusher bar 32 and a motorised actuating mechanism 34 connected to the pusher bar 32 for moving the pusher bar 32 towards the chamber 12 to push a row of vials on to the accumulation table 28 and for subsequently retracting the pusher bar 32 to enable another row of vials to be accumulated. For cold shelf loading, the pusher bar 32 may be provided with a mechanism for actuating a safety bar 36 that prevents vials from falling as they are pushed on to the accumulation table 28.

The accumulation table 28 is a fixed plate located adjacent the pusher conveyor 24 and forms part of a bridge plate module which enables vials to be transferred from the pusher conveyor 24 on to the shelf 14 to be loaded. The bridge plate module further includes a bridge plate 38 and an intermediate plate 40.

Figure 3:
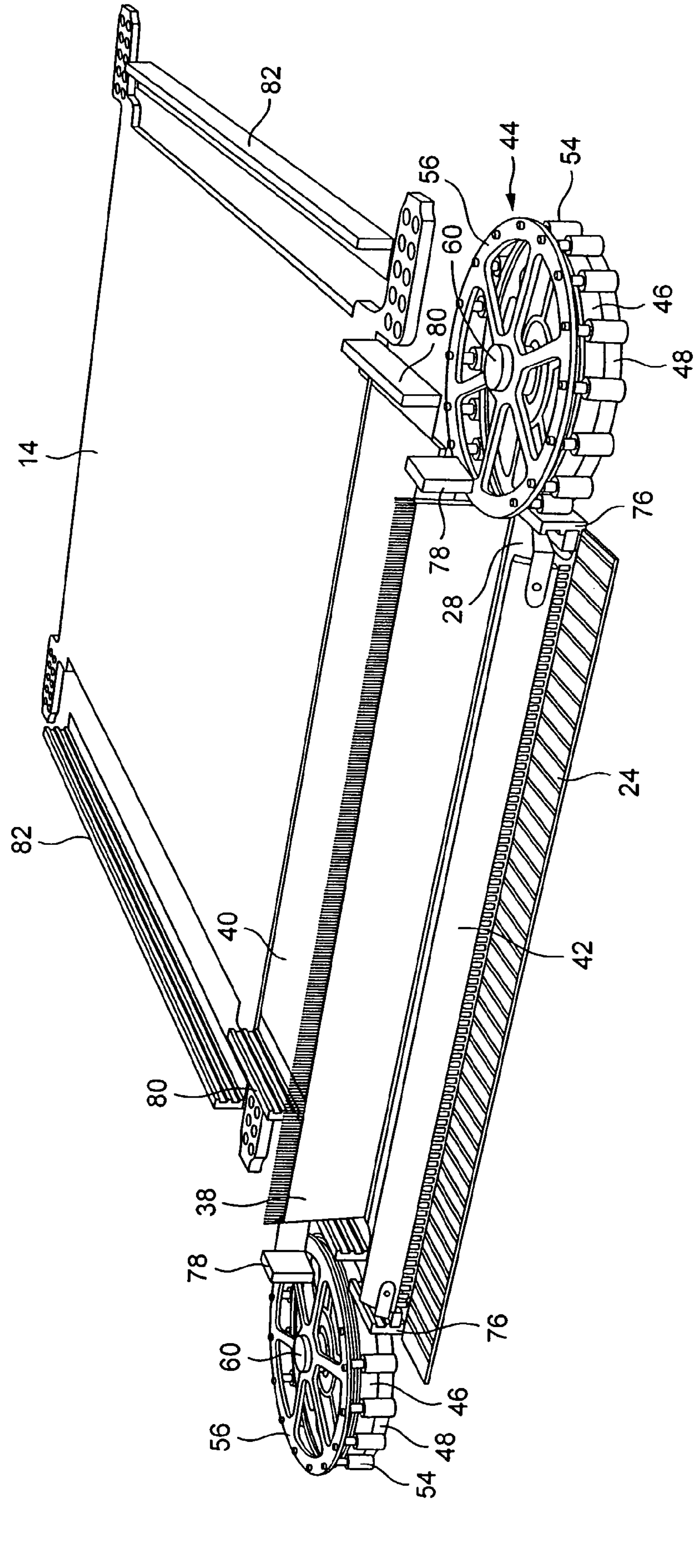
FIG. 3 is a perspective view of part of an assembly for loading vials into and/or unloading vials from the freeze dryer of FIG. 1.

As shown in FIG. 3, the intermediate plate 40 is located within the freeze dryer chamber 12 at the same level as the loading position for the shelves 14, and can be automatically moved horizontally away from a filled, or emptied, shelf 14 at the loading position to enable that shelf to be raised, or lowered, within the chamber 12. The shelves may be provided with means, such as dowels or the like, which engage corresponding holes or recesses in the intermediate plate 40 to ensure accurate horizontal alignment between a shelf 14 and the intermediate plate 40 as a shelf is maneuvered into the loading position.

The bridge plate 38 is located between the accumulation table 28 and the intermediate plate 40. The bridge plate 38 can be rotated from the stowed, raised position shown in FIG. 3 relative to the accumulation table 28 and the intermediate plate 40 so that part of the bridge plate 38 extends into the chamber 12 through the slot to enable the bridge plate 38 to register and align horizontally both with the intermediate plate 40 within the chamber 12 and with the accumulation table 28 outside the chamber 12. The bridge plate 38 and intermediate plate 40 have profiled edges that mate together as the bridge plate is rotated into location with the intermediate plate 40. A mechanism for rotating the bridge plate 38 and moving horizontally the intermediate plate 40 is located beneath the bridge plate 38. Rotation of the bridge plate 38 back to the raised position can enable the slot door 16 to be closed.

Figure 4:
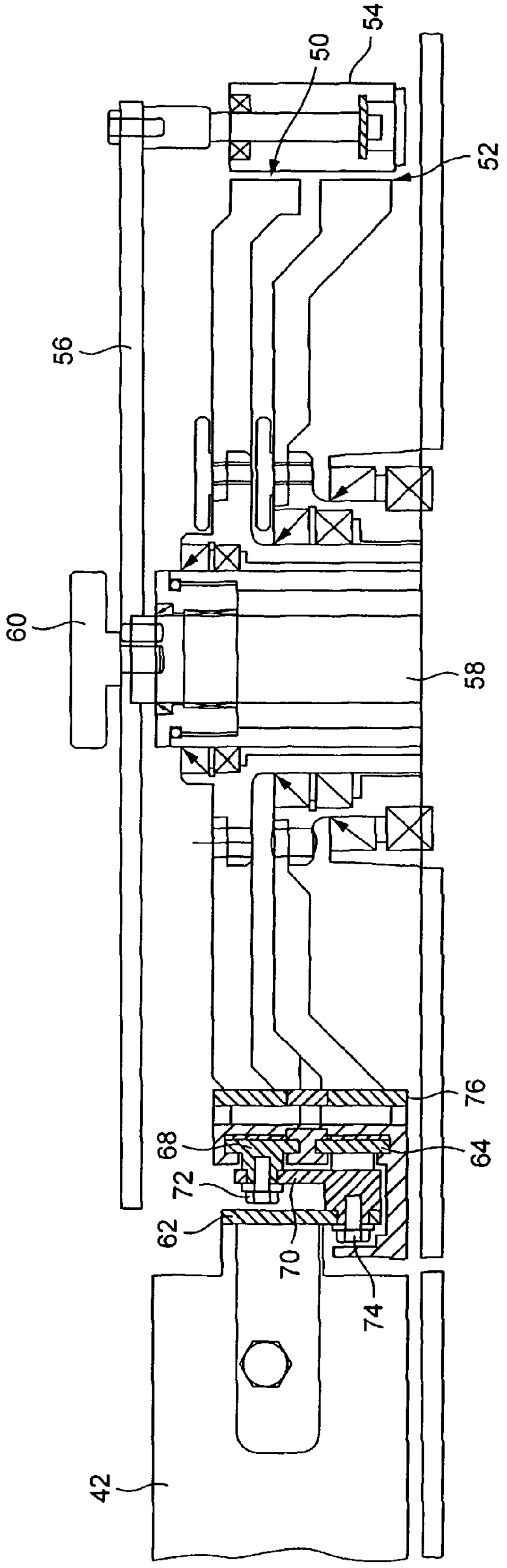
FIG. 4 is a cross-section through part of an assembly for loading vials into and/or unloading vials from the freeze dryer of FIG. 1, with the transfer bar in a lowered position.
Figure 5:
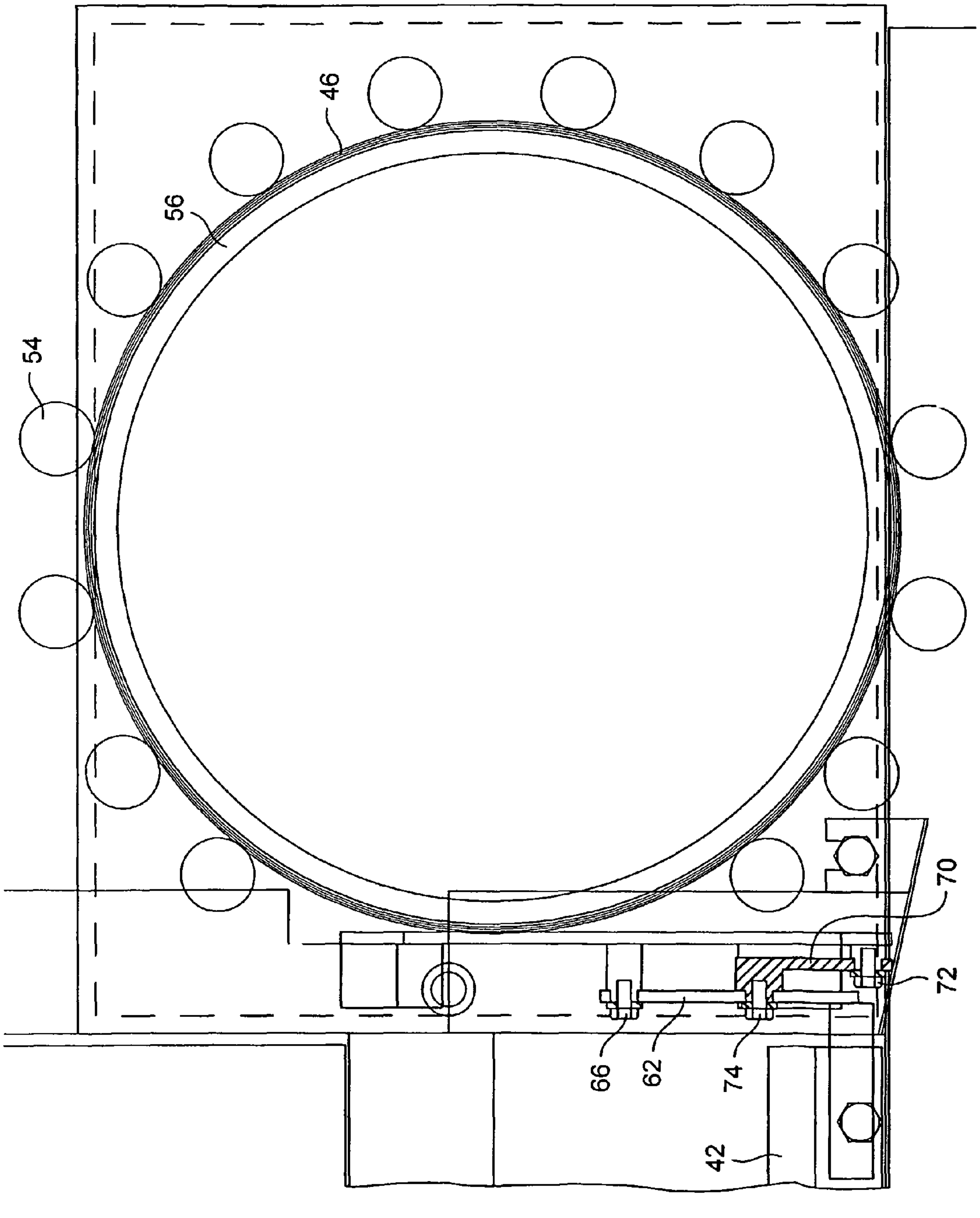
FIG. 5 is a top view of the part of the assembly shown in FIG. 4, with the transfer bar in a raised position.

FIG. 3 also shows a transfer bar 42 of the assembly, which, in the embodiment shown in FIG. 1, serves to unload the chamber 12. The transfer bar 42 extends substantially the width of a shelf 14, and is connected at each end to a reel assembly 44 for effecting movement of the transfer bar 42 into and out from the chamber 12, and for raising and lowering the transfer bar 42. Each reel assembly 44 comprises two stainless steel spring upper and lower ribbons 46, 48. Each upper (as shown in FIG. 4) ribbon 46 is wound around an upper drum 50, and each lower ribbon 48 is wound around a lower drum 52, the upper and lower drums 50, 52 of each reel assembly 44 being co-axial. With reference also to FIG. 5, the ribbons 46, 48 are retained on the drums by rollers 54 extending about the drums 50, 52 and depending from a mounting plate 56 connected to a drive shaft 58 by a fixing member 60.

The free ends of the ribbons 46, 48 of each reel assembly 44 are connected to the transfer bar 42 via a connecting member 62 attached to the transfer bar 42 and extending substantially orthogonal therefrom. The free end of the lower ribbon 48 is rigidly attached to a first linking member 64, the first linking member 64 being pivotally attached to the connecting member 62 via pivot 66. The free end of the upper ribbon 46 is rigidly attached to a second linking member 68. The second linking member 68 is pivotally attached to a linking arm 70 via pivot 72, the linking arm being in turn pivotally attached to the connecting member 62 via pivot 74.

Figure 6:
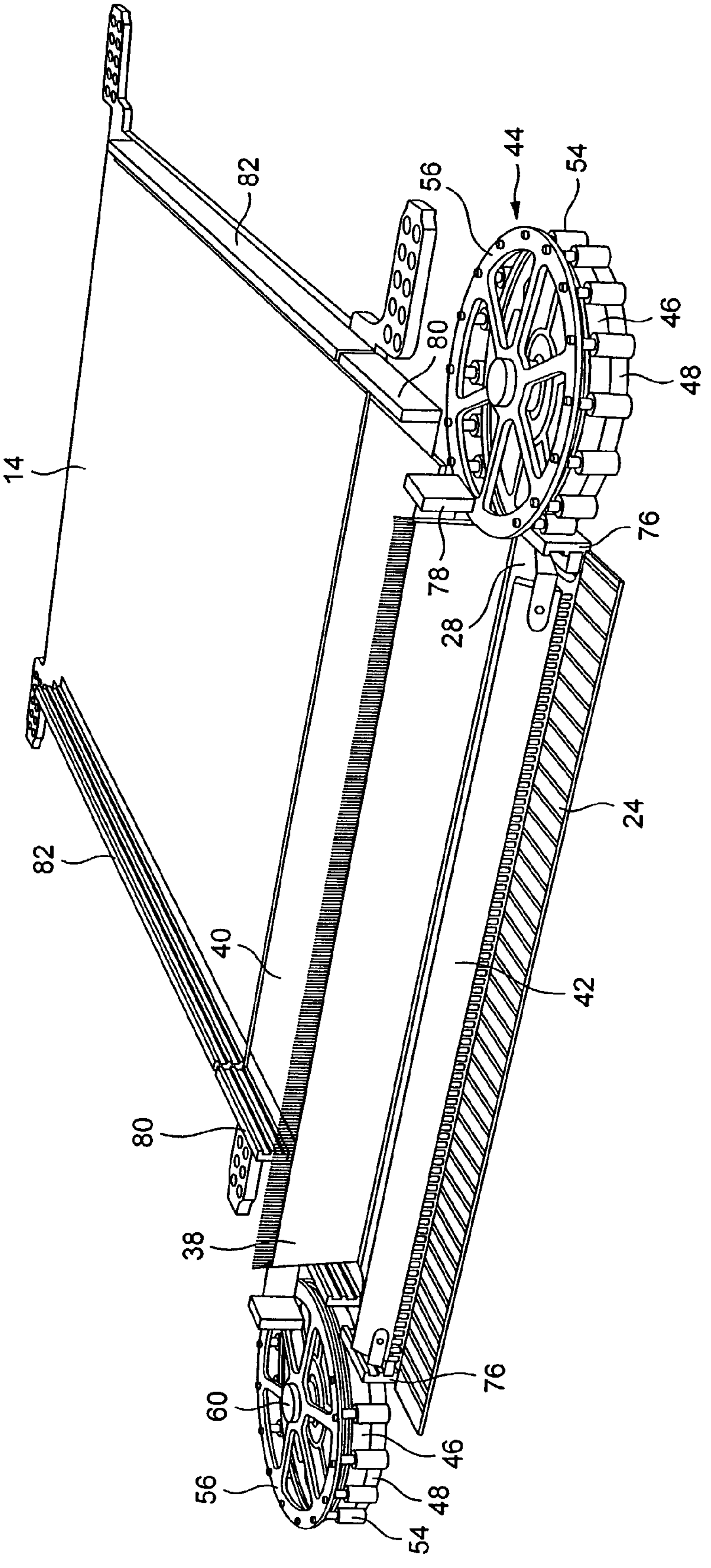
FIG. 6 is the same perspective view of FIG. 3, showing the guide members 82 in a deployed position.

Movement of the first and second linking members 68, 64 as the coils are unwound from the drums is guided by guide members 76, 78, 80, 82 located on each side of the transfer bar 42. Each guide member comprises upper and lower slots, movement of the first linking member 68, and thus the free end of the upper ribbon 46, being guided by the upper slots and the movement of the second linking member 64, and thus the free end of the lower ribbon 48, being guided by the lower slots. Guide members 76 are attached to the sides of the accumulation table 28, guide members 78 are attached to the sides of the bridge plate 38, and guide members 80 are attached to the sides of the intermediate plate 40. In this embodiment, guide members 82 are moveable between a stowed position, shown in FIG. 3, where they are spaced from the shelf 14 to allow the shelf 14 to be raised or lowered within the chamber 12, and a deployed position, shown in FIG. 6, where the guide members 82 are co-linear with the guide members 80. Alternatively, the guide members 82 may be fixed. The guide members 76, 78, 80 and 82 also serve to guide the rows of vials as they are loaded into, and unloaded from, the chamber 12.

The drive shafts 58 of the reel assemblies 44 are connected to a common servomotor located beneath the supporting frame 18. Each drive shaft 58 is connected directly to the upper drum 50 of the respective reel assembly 44, the drums 50, 52 being configured such that rotation of the upper drum 50 causes both drums 50, 52 of the assembly 44 to be rotated synchronously. This enables the upper and lower ribbons 46, 48 to be simultaneously unwound from, or wound on to, the drums 50, 52 to move the transfer bar 42 into, or out from, the chamber 12 as required. The lower drum 52 can also be rotated independently from the upper drum, for example, by short stroke air cylinders provided beneath the supporting frame 18 or by servo motors, to effect lowering and raising of the transfer bar 42.

Figures 7A, 7B:
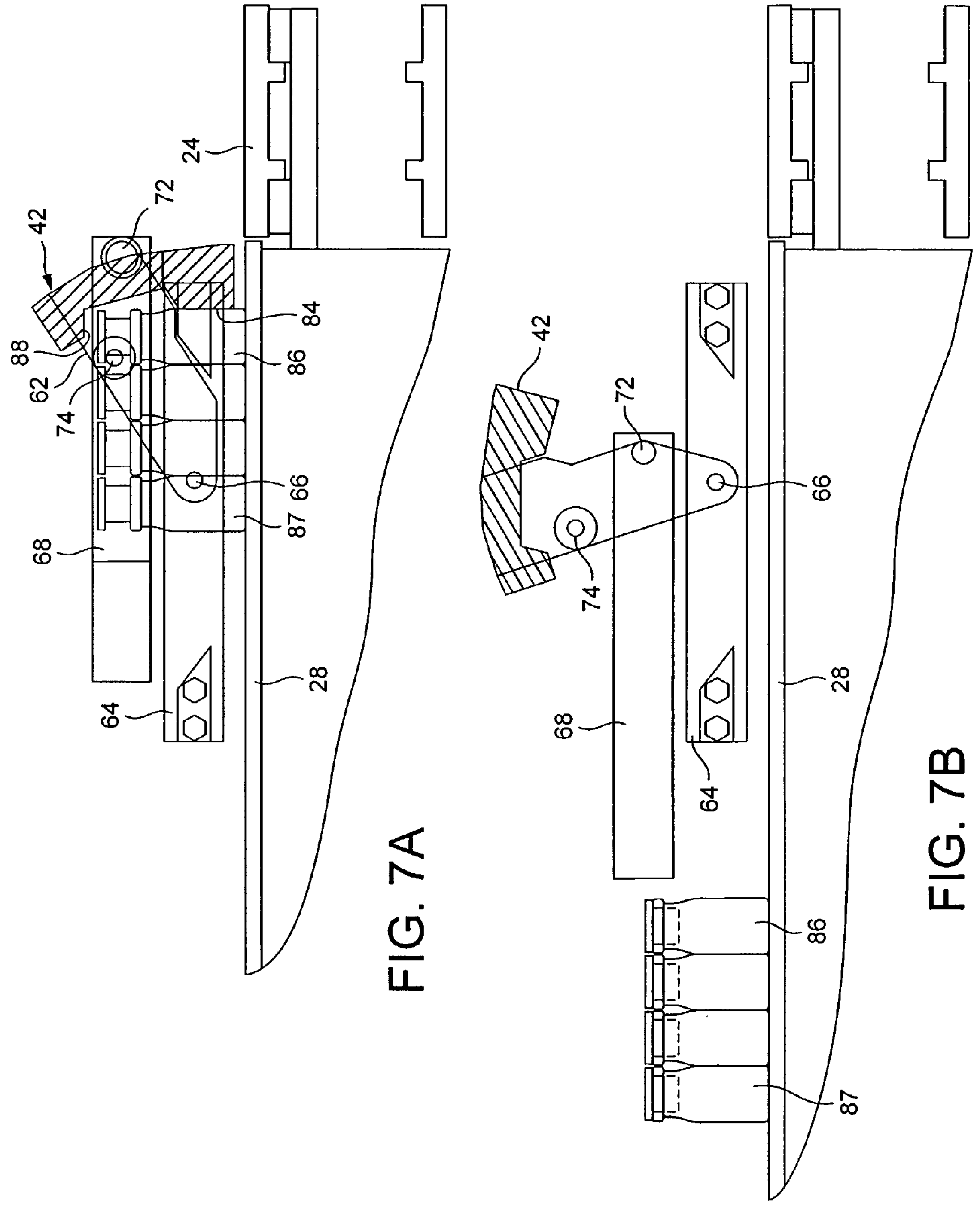
FIGS. 7(*a*) to (*d*) are side views of the transfer bar of the assembly in respective different positions during the loading and unloading of vials from the freeze dryer.
Figure 7C:
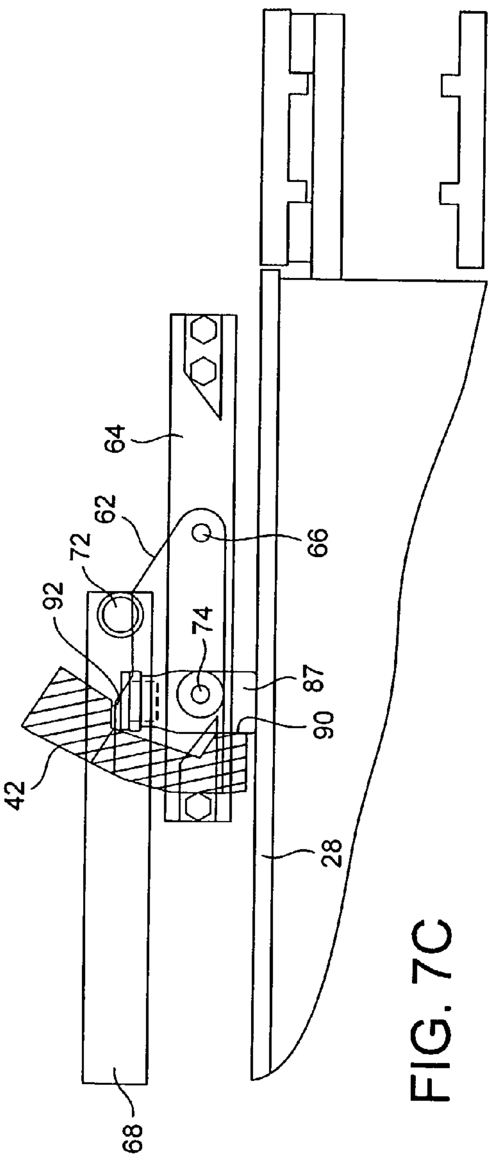
Figure 7D:
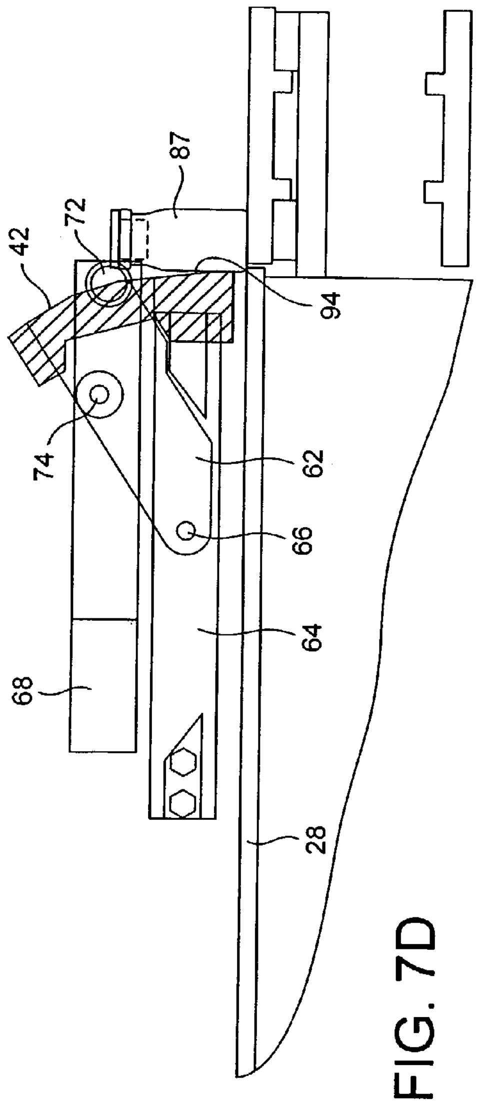
Figure 8A:
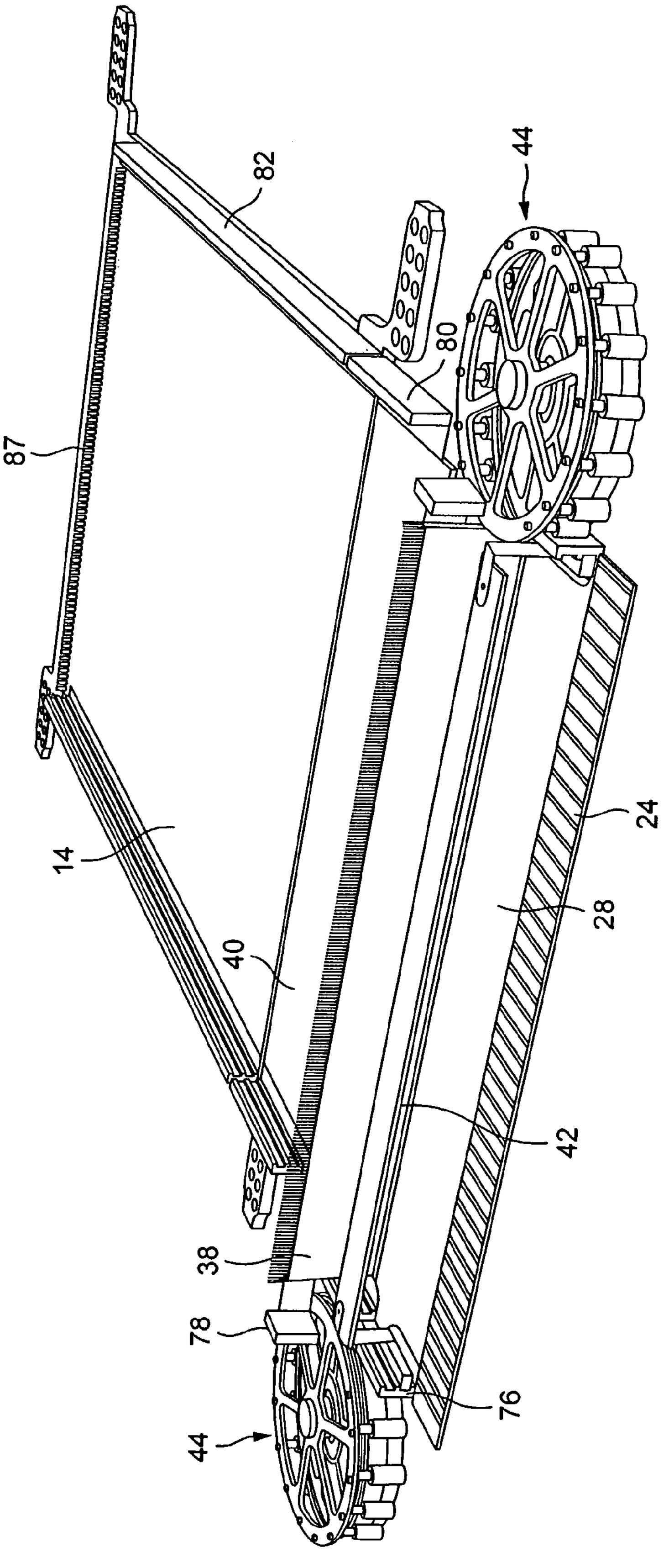
FIGS. 8(*a*) to (*i*) are a sequence of perspective views of the assembly during the unloading of vials from the freeze dryer.
Figure 8B:
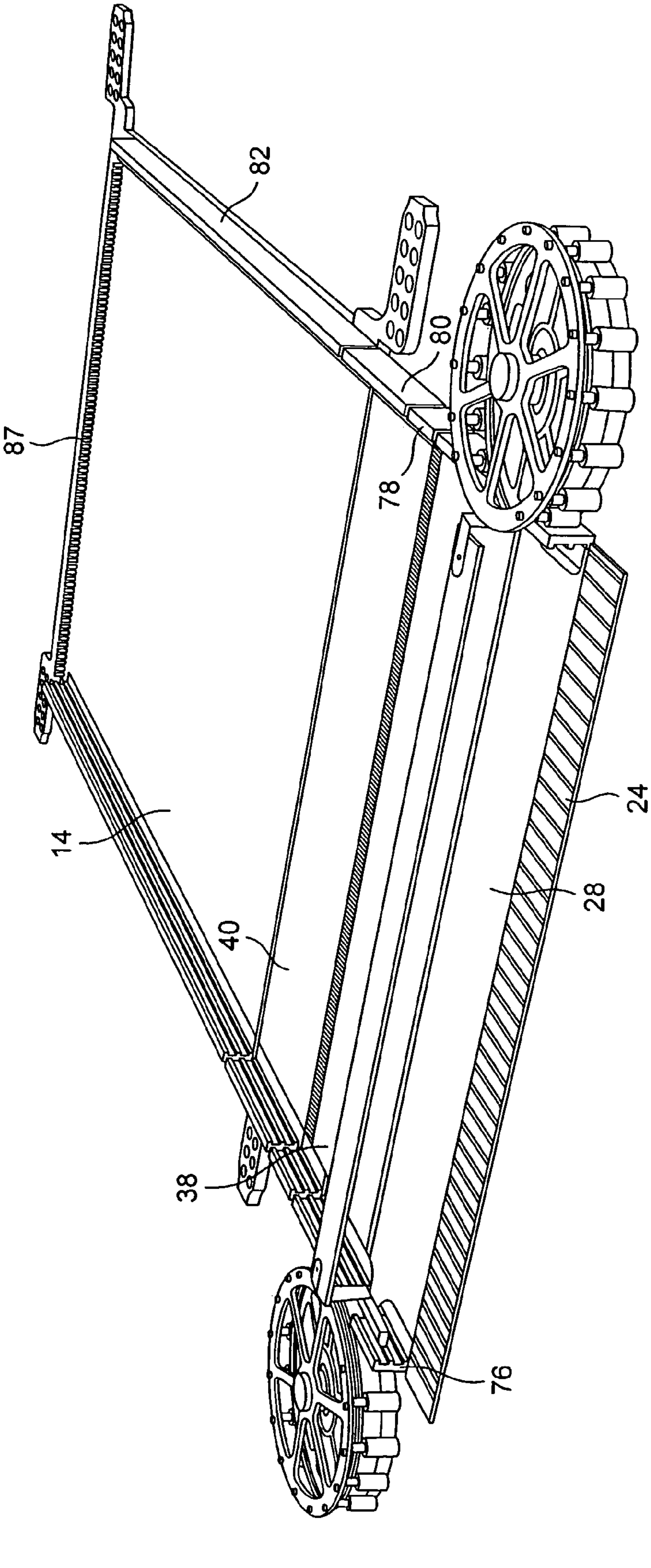
Figure 8C:
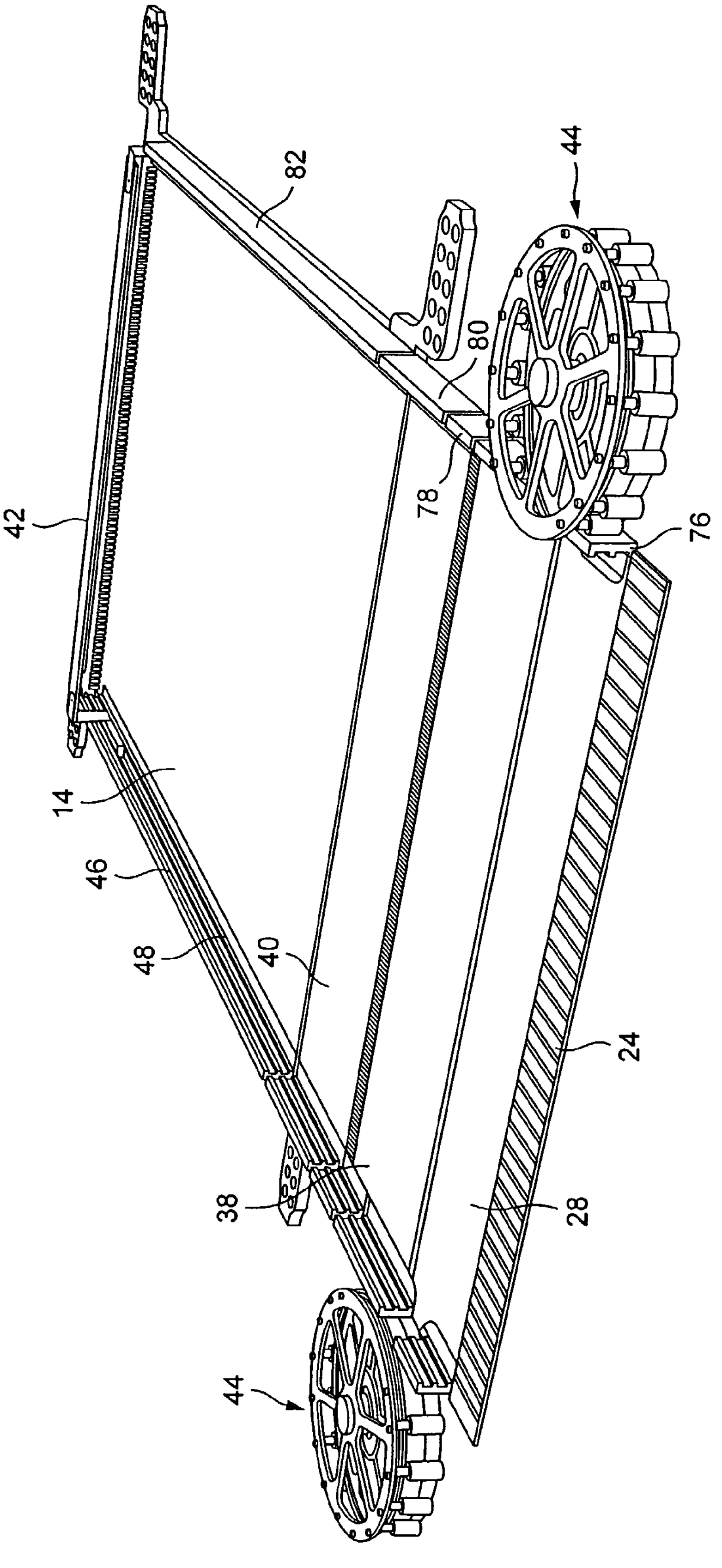
Figure 8D:
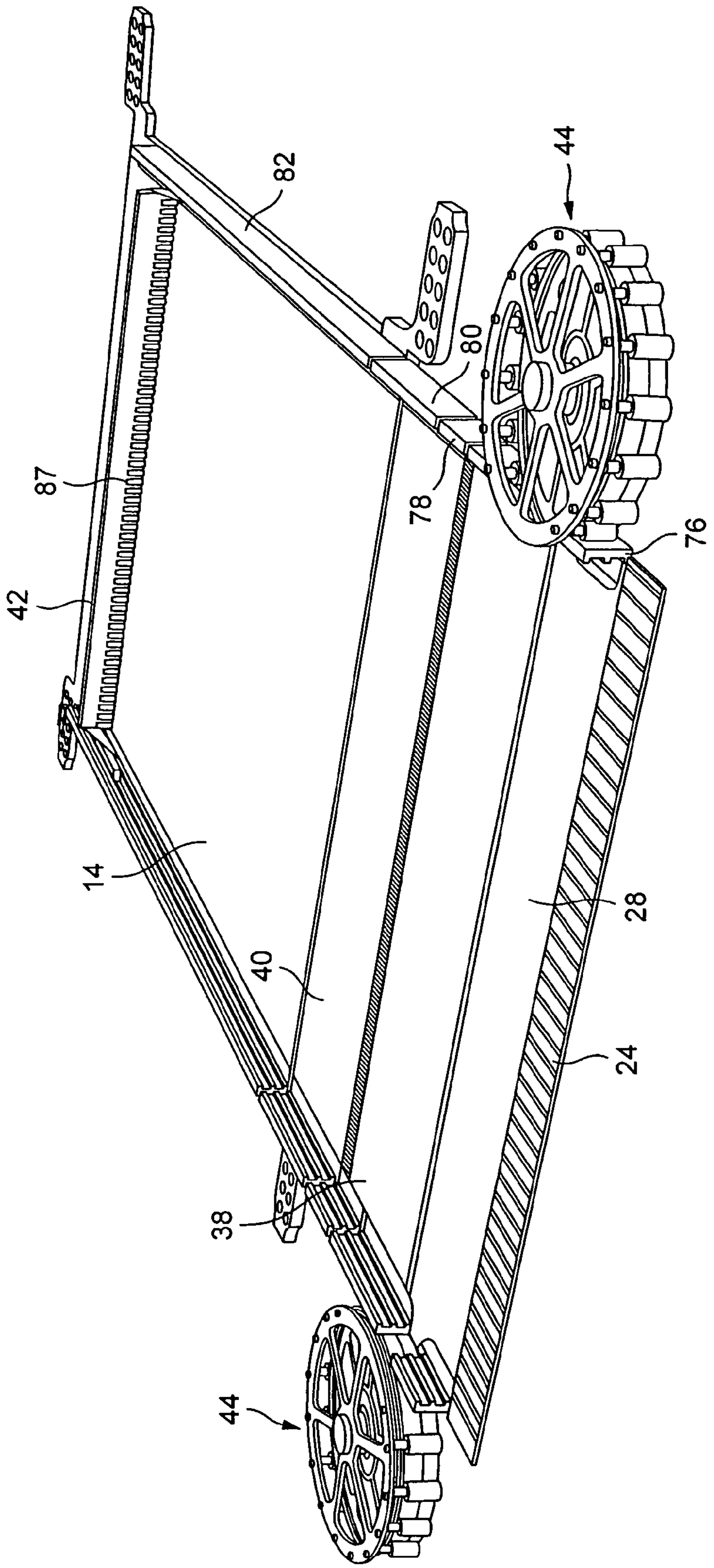
Figure 8E:
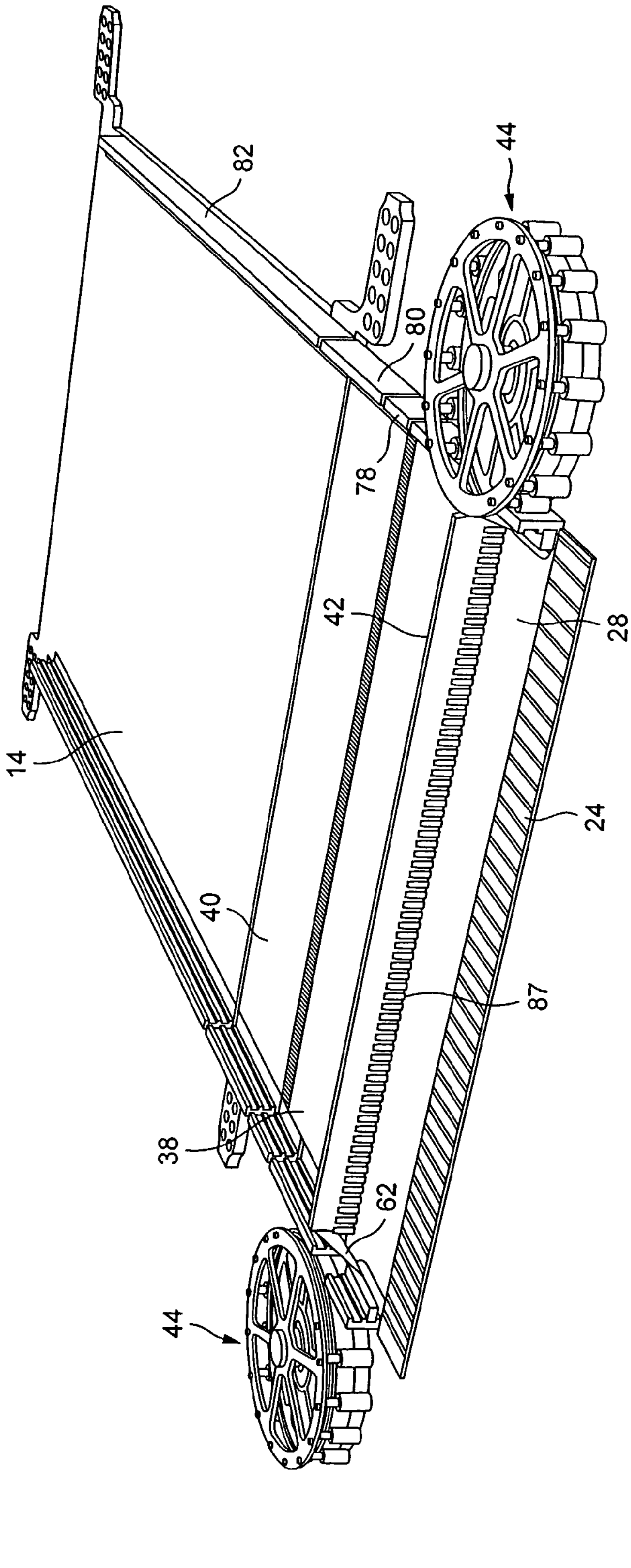
Figure 8F:
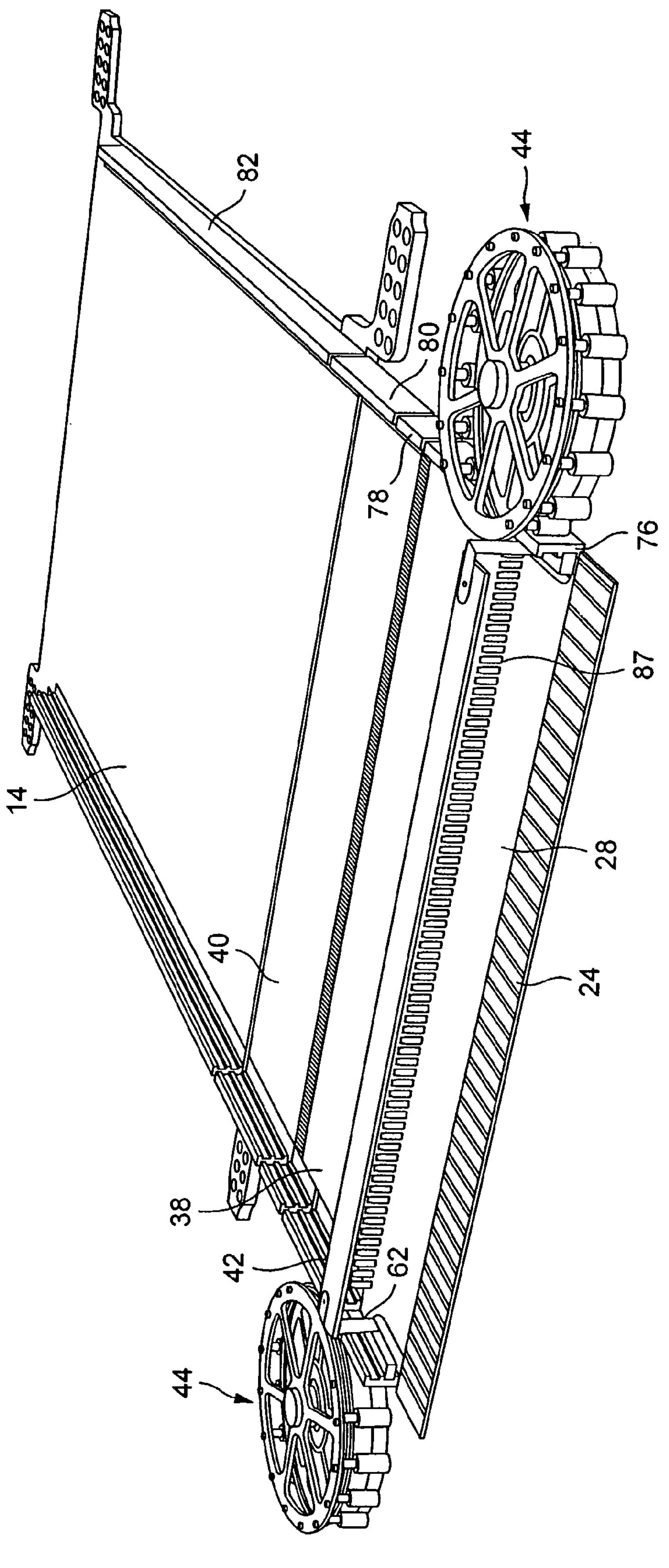
Figure 8G:
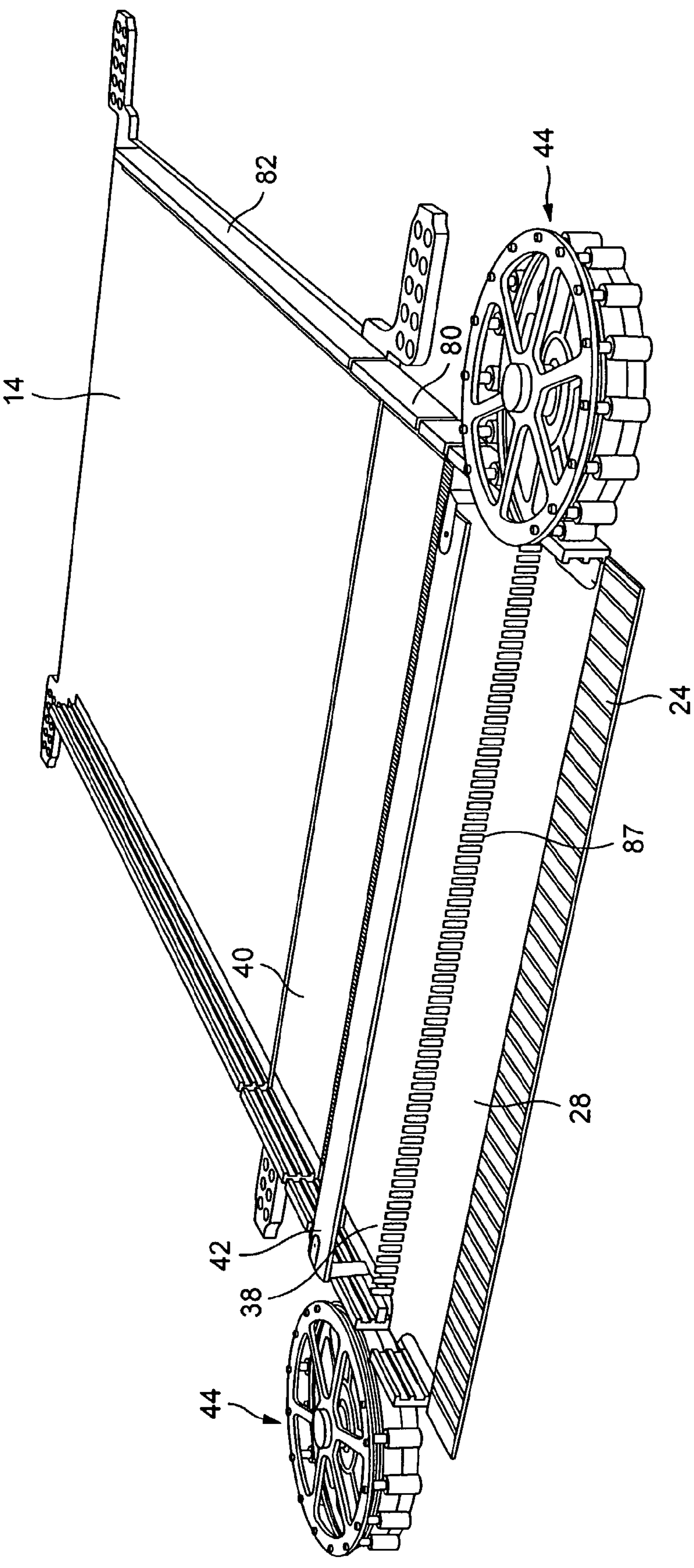
Figure 8H:
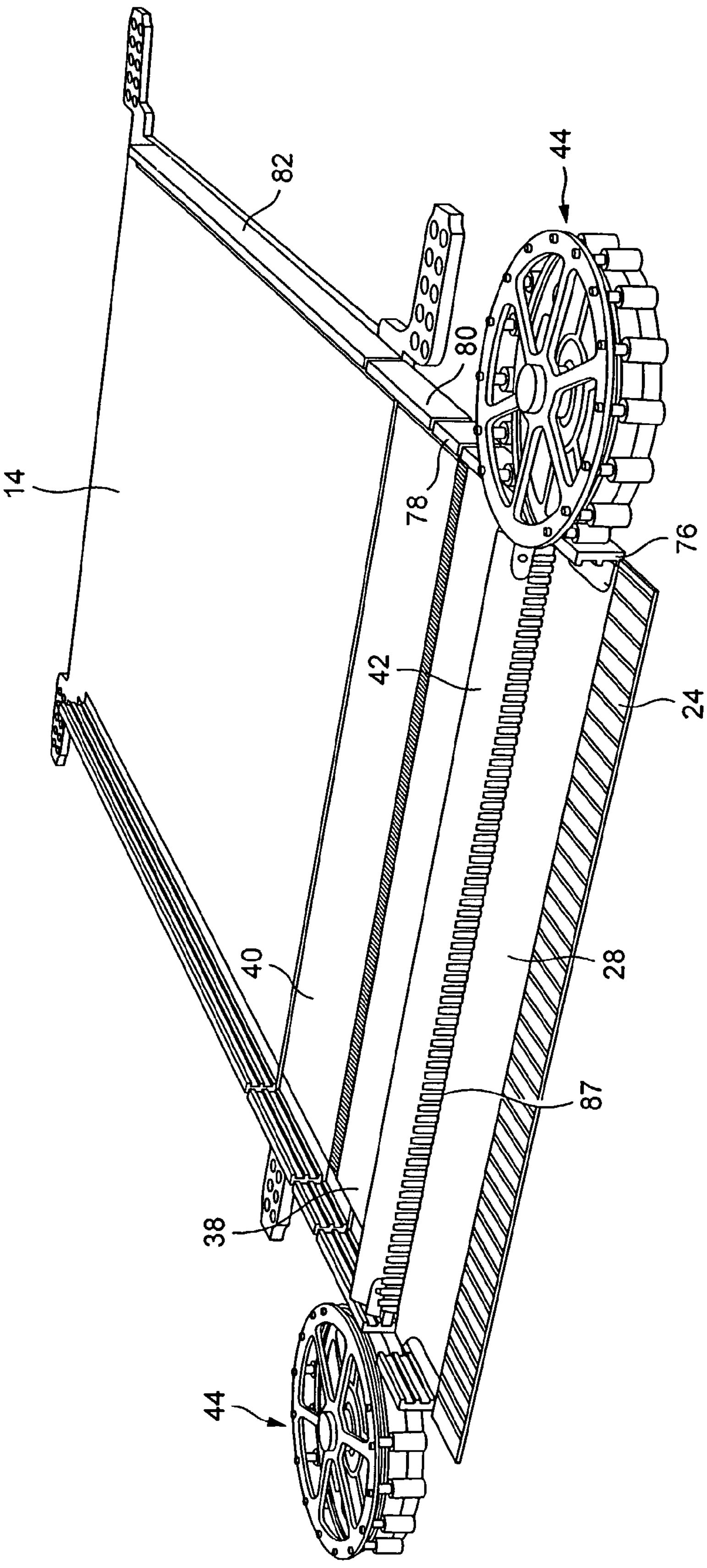
Figure 8I:
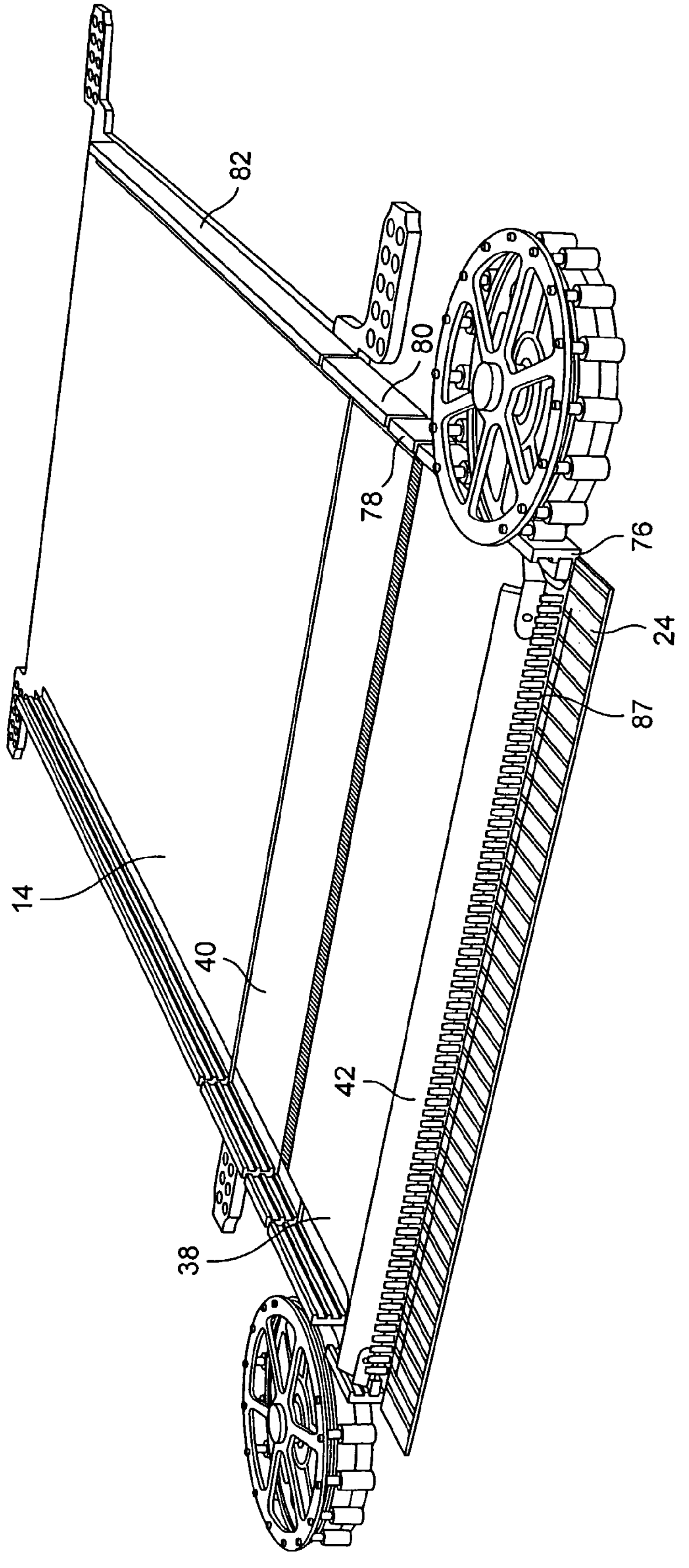

The different positions that the transfer bar 42 can adopt are illustrated in FIG. 7. In the loading position shown in FIG. 7(*a*), the transfer bar 42 is located in front of the rows of vials to enable a first abutment surface 84 to contact the first row of vials 86 and push the rows into the chamber 12. In this position, a first shoulder 88 of the transfer bar 42 serves to prevent the first row of vials 86 from falling as the rows are pushed into the chamber 12. In the transfer position shown in FIG. 7(*b*), the lower ribbon 48 has been wound relative to the upper ribbon 46 to rotate the connecting member 62 anticlockwise (as shown in FIG. 7) about pivot 66 and thus cause the transfer bar 42 to rise to the transfer position. When in this raised position, the transfer bar 42 can be moved over the tops of the vials in the chamber 12 by unwinding synchronously the upper and lower ribbons 46, 48 of the reel assemblies 44. In the unloading position shown in FIG. 7(*c*), the lower ribbon 48 has been further wound relative to the upper ribbon 46 to further rotate the connecting member 62 anticlockwise about pivot 66 and thus lower the transfer bar 42. In this position, a second abutment surface 90 of the transfer bar 42 contacts the last row of vials 87 in the chamber to pull the vials out from the chamber 12, with a second shoulder 92 of the transfer bar 42 serving to prevent the last row of vials 87 from falling as the vials are withdrawn from the chamber 12. In the last row unloading position shown in FIG. 7(*d*), the transfer bar is returned to the position shown in FIG. 7(*a*), save that a third abutment surface 94, located on the opposite surface of the transfer bar 42 to the first abutment surface 84, is brought into contact with the last row of vials 87 from the final shelf of the chamber 12 to be unloaded.

Returning now to FIG. 1, the assembly for loading and unloading the chamber 12 also includes an out-feed conveyor 96 for collecting vials from the pusher conveyor 24. Appropriate guiding (not shown) ensures a smooth transition between these conveyors. The out-feed conveyor 96 is driven by an adjustable speed motor located beneath the supporting frame 18.

A typical sequence for loading the chamber 12 using the assembly shown in FIG. 1 will now be described. For cold shelf loading, a different loading sequence may be employed.

First, the slot door 16 is raised to allow vials to be inserted into the chamber 12 through the slot formed in the chamber wall. The bridge plate 38 is rotated from the raised position shown in FIG. 3 to create a bridge between the accumulation table 28 and the freeze dryer intermediate plate 40. When the first shelf 14 to be loaded has been located at the loading position, the intermediate plate 40 is docked to the shelf 14, and the moveable guide members 82 are moved to the deployed position shown in FIG. 6.

Vials from the filling line arrive on the in-feed conveyor 20, which acts as a buffer. When a sensor detects that the number of vials in the buffer is sufficient, the in-feed star wheel 22 transports the required number of vials to the synchronized pusher conveyor 24. This mechanism eliminates the linear errors caused by diametrical tolerance of the vials. The loading pusher 26 pushes the complete row of vials forward against the previous row of vials (if any) on the accumulation plate 28, and pushes the whole pack forwards by the equivalent of one vial diameter. When sufficient rows of vials to fill a shelf 14 have been assembled, the loading pusher 26 pushes the pack clear of the accumulation plate 28 and the bridge plate 38 and positions the pack on the shelf 14. Alternatively, for cold shelf filling, the vials may be pushed row by row from the pusher conveyor 24 directly on to the shelf 14, or a number of rows of vials may be pushed at a time on to the shelf 14.

After retraction of the loading pusher 26, the moveable guide members 82 are raised, the intermediate plate 40 is undocked from the shelf 14 and the bridge plate 38 is rotated to enable the freeze dryer to position the next empty shelf for loading. While the shelf is being positioned the next rows of vials are being assembled.

The sequence is repeated until the last shelf to be loaded. When all of the shelves have been loaded with vials, the moveable guide members 82 are raised, the intermediate plate 40 is retracted, the bridge plate 38 is raised and the slot door 16 is closed.

A typical sequence for unloading the chamber 12 using the assembly shown in FIG. 1 will now be described, with the movement of the bridge plate 38 and transfer bar 42 during unloading being illustrated in FIGS. 8(*a*) to 8(*i*), which, for simplicity, show only a single row of vials 87.

First, the slot door 16 is raised to allow vials to be removed from the chamber 12 through the slot formed in the chamber wall. When the first shelf 14 to be unloaded has been located at the loading position, the moveable guide members 82 are moved to the deployed position, as shown in FIG. 8(*a*). The bridge plate 38 is then rotated from the raised position shown in FIG. 8(*a*) to the horizontal position shown in FIG. 8(*b*) to create a bridge between the accumulation table 28 and the freeze dryer intermediate plate 40, and the intermediate plate 40 is docked to the shelf 14.

With the transfer bar in the raised position, as shown in FIG. 8(*b*), the ribbons 46, 48 of each reel assembly 44 are synchronously unwound to move the vial pack beyond the final row of vials 87 as shown in FIG. 8(*c*). The transfer bar 42 is then lowered to the unloading position as shown in FIG. 8(*d*). The ribbons 46, 48 of each reel assembly 44 are then synchronously wound to cause the second abutment surface 90 of the transfer bar to contact vial row 87 to pull the vial pack from the chamber 12 towards the pusher conveyor 24.

When the last row of vials reaches the pusher conveyor 24, the transfer bar 42 is returned to the raised position shown in FIG. 8(*a*). The moveable guide members 82 are raised, and the intermediate plate 40 is undocked to enable the freeze dryer to position the next shelf for unloading.

The cycle is repeated up to the final shelf to be unloaded. When the last row of vials from the vial pack remains on the accumulation table 28, as shown in FIG. 8(*e*), the transfer bar 42 is raised to the position shown in FIG. 8(*f*), and moved towards the chamber 12 to the position shown in FIG. 8(*g*) before the transfer bar 42 is lowered to the last row unloading position as shown in FIG. 8(*h*). Finally, the ribbons 46, 48 of each reel assembly 44 are synchronously wound to push the last row 87 on to the pusher conveyor 24, as shown in FIG. 8(*i*). The moveable guide members 82 are raised, the intermediate plate 40 is retracted, the bridge plate 38 is raised and the slot door 16 is closed.

Figure 9:
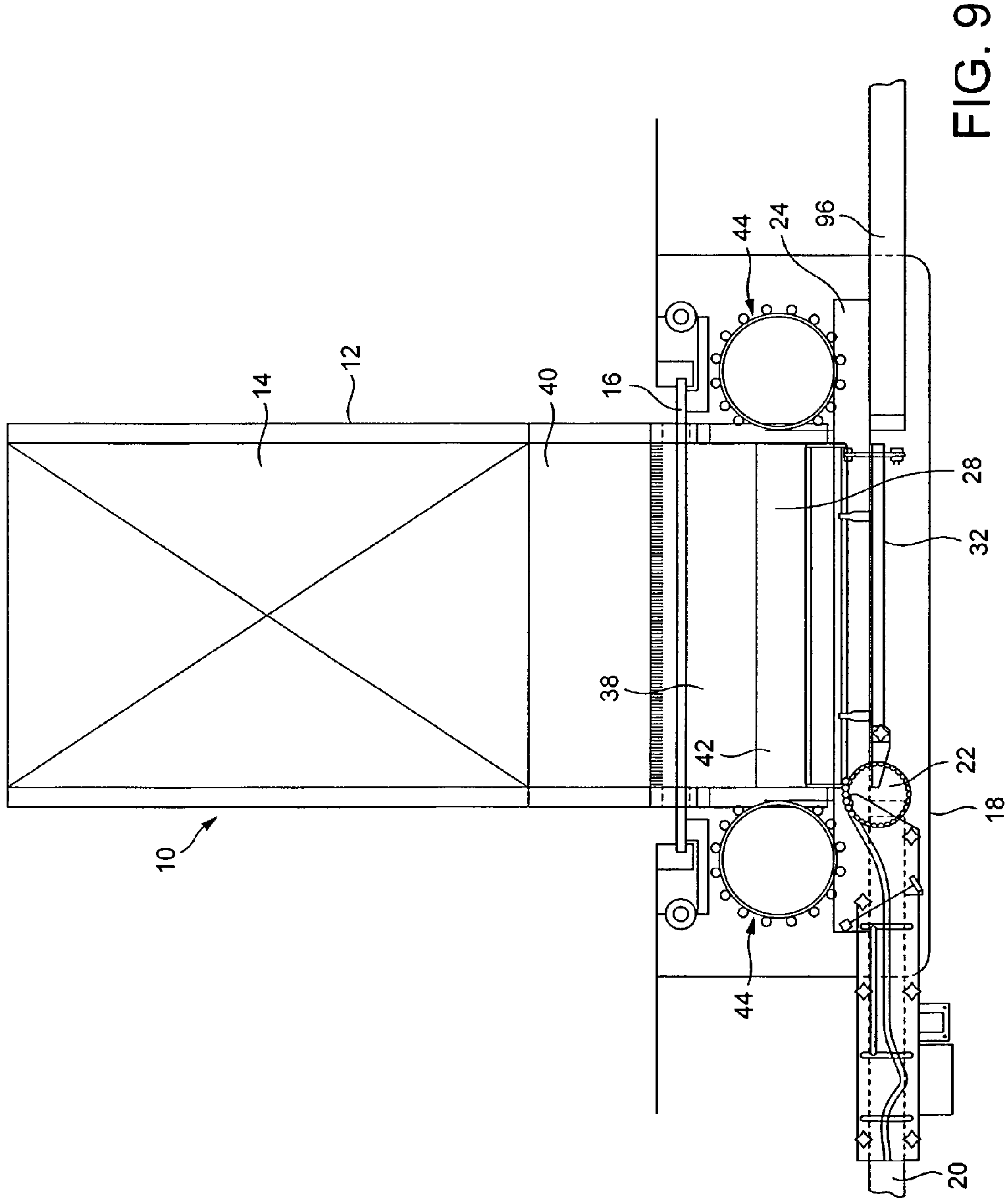
FIG. 9 is a plan view of a second embodiment of a freeze dryer.

In the embodiment shown in FIG. 1, the transfer bar is used only to unload the vials from the chamber 12. In a second embodiment shown in FIG. 9, the transfer bar 42 is also used to load the vials into the chamber 12. In this embodiment, the motorised actuating mechanism 34 of the first embodiment is no longer required, as the pusher bar 32 is only required to have a short stroke sufficient to transfer a row of vials from the pusher conveyor 24 on to the accumulation table. The mechanism for moving the pusher bar 32 can now be conveniently accommodated beneath the supporting frame 18. This can provide a further reduction in the size of the over-all footprint of the freeze dryer 10.

While the foregoing description and drawings represent the preferred embodiments of the present invention, it will be apparent to those skilled in the art that various changes and modifications may be made therein without departing from the true spirit and scope of the present invention.

I claim:

1. An assembly for loading vials into or unloading vials from a chamber of a freeze dryer, the assembly comprising a transfer bar for engaging vials to effect movement thereof, and moving means for moving the transfer bar, wherein the moving means comprises a first and second pairs of ribbons of elongate resilient members, connecting means for connecting the ribbons to the transfer bar such that the transfer bar is pivotally attached at each end thereof to a respective pair of ribbons, and drive means for synchronously unwinding the ribbons to effect lateral movement of the transfer bar and for selectively winding or unwinding one of the ribbons of each pair relative to the other to raise the transfer bar.

2. The assembly according to claim 1, wherein the drive means comprises rotational means for rotating synchronously each pair of ribbons to effect lateral movement of the transfer bar, and selective means for selectively effecting relative rotational movement between the ribbons of each pair to raise the transfer bar.

3. The assembly according to claim 1, wherein each ribbon is wound on a respective drum, the drive means being arranged to rotate the drums to move the transfer bar.

4. The assembly according to claim 3, comprising retaining means for retaining the ribbons on the drums.

5. The assembly according to claim 4, wherein the retaining means comprises a plurality of rollers extending about the drums.

6. The assembly according to claim 1, comprising guide means for guiding the free ends of the ribbons during unwinding.

7. The assembly according to claim 6, wherein the guide means comprises slots located on either side of the transfer bar, the free end of each ribbon being located within a respective slot.

8. The assembly according to claim 6, wherein at least part of the guide means is selectively moveable between deployed and stowed positions.

9. The assembly according to claim 1, wherein the connecting means comprises first and second connecting members each attached to a respective end of the transfer bar and extending substantially orthogonal to the transfer bar.

10. The assembly according to claim 9, wherein a first ribbon of each pair is attached to a connecting member via a first linking member, and a second ribbon of each pair is attached to a connecting member via a second linking member.

11. The assembly according to claim 10, wherein each first ribbon is rigidly attached to a respective first linking member, each first linking member being pivotally attached to a respective connecting member.

12. The assembly according to claim 10, wherein each second ribbon is rigidly attached to a respective second linking member, each second linking member being pivotally attached to a respective connecting member via a respective arm pivotally attached to both the second linking member and the connecting member.

13. The assembly according to claim 10, wherein the second ribbons are wound or unwound relative to the first ribbons to effect raising of the transfer bar.

14. The assembly according to claim 1, wherein a surface of the transfer bar has a first shoulder for stabilizing vials engaged thereby during loading of the chamber, and a second shoulder for stabilizing vials engaged thereby during unloading of the chamber.

15. The assembly according to claim 1, wherein each elongate resilient member comprises a resilient band.

16. The assembly according to claim 1, wherein each elongate resilient member comprises a flat spring.

17. A freeze dryer comprising a chamber and an assembly according to claim 1 for loading vials into or removing vials from the chamber.

18. The freeze dryer according to claim 17, wherein the assembly is arranged to load or unload the chamber through a slot provided in the chamber.

* * * * *